Patented Nov. 23, 1943

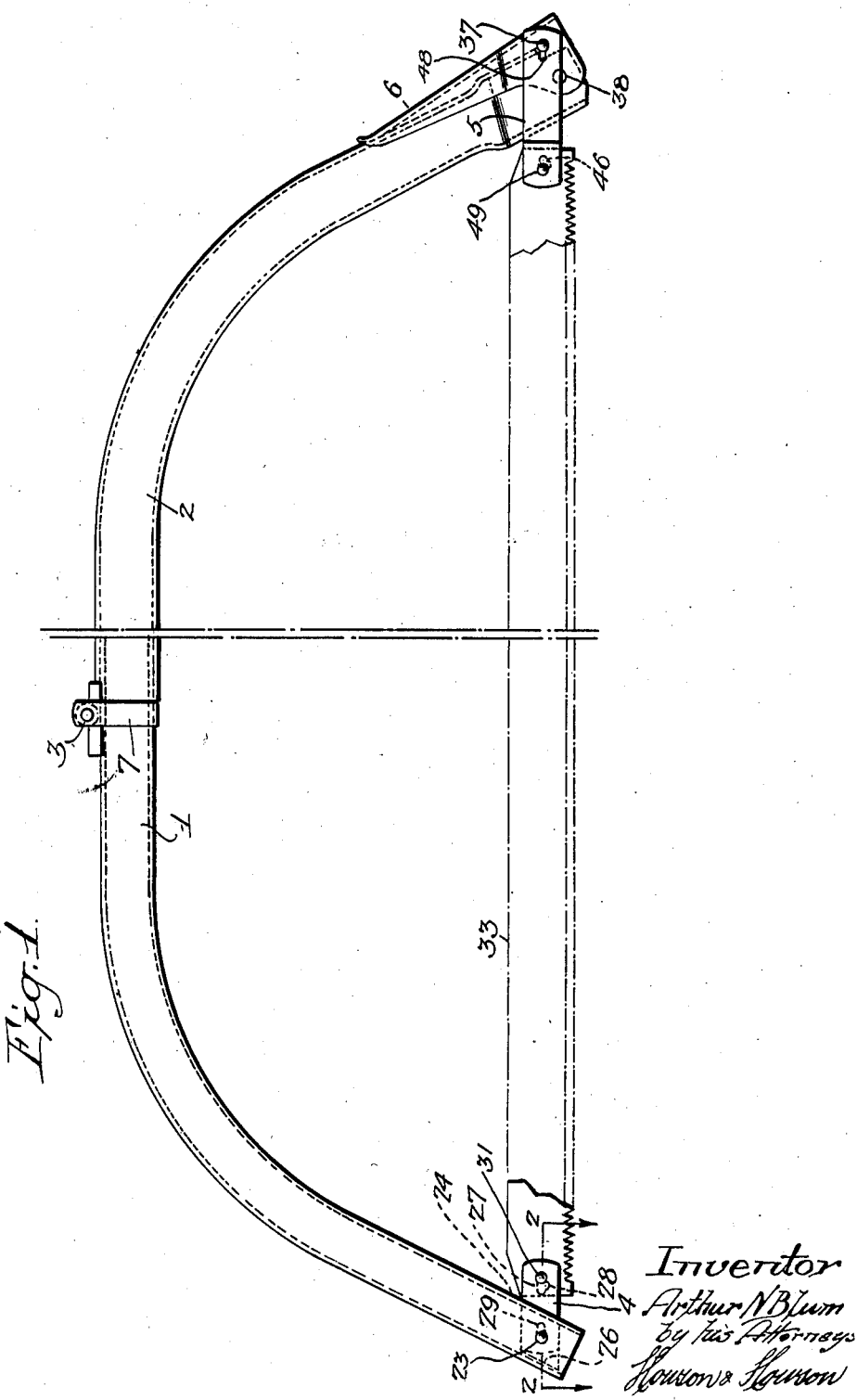

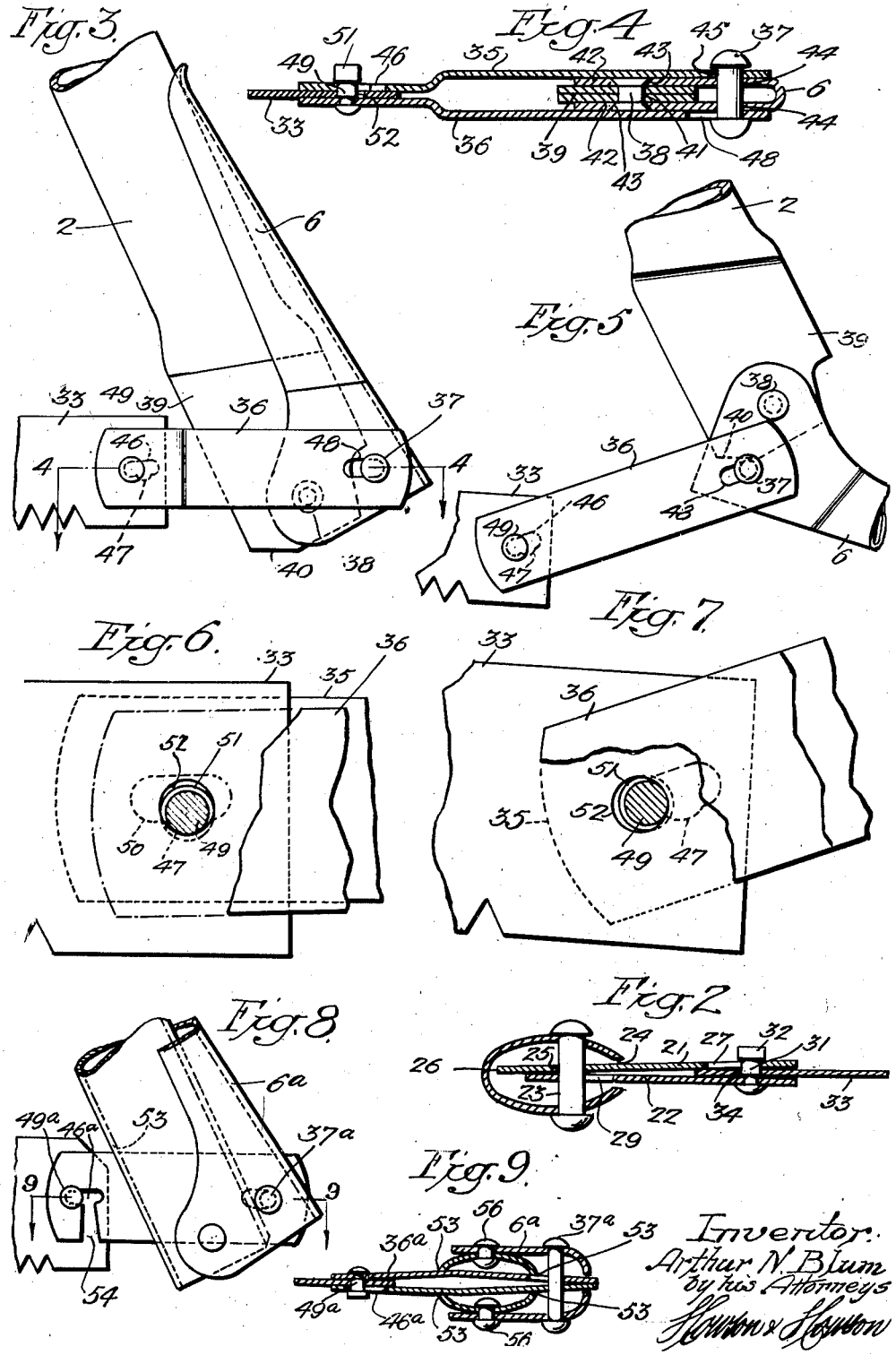

2,335,141

UNITED STATES PATENT OFFICE 2,335,141

DEVICE FOR LOCKING SAW BLADES IN FRAMES

Arthur N. Blum, Philadelphia, Pa.

Original application March 7, 1940, Serial No. 322,807. Divided and this application April 24, 1942, Serial No. 440,368

6 Claims. (Cl. 145—35)

This invention relates to a device for locking saw blades in frames, and is a division of my application Serial No. 322,807 filed Mar. 7, 1940, now Patent No. 2,296,241, issued September 22, 1942.

One object of the invention is to provide novel and improved means for securing the saw blade in the frame and for effecting the proper tensioning of said blade, said securing means being easily and conveniently manipulated and exhibiting a high degree of safety in blade removal.

Another object of the invention is to provide novel means for limiting the maximum tensioning of the saw blade, said limiting means being subject, however, to modification so as to increase the maximum tensioning of the blade if required.

A further object of the invention is to provide a means for attachment of saw blades in general which is simple in operation and inexpensive in mass production.

The invention resides further in certain novel structural details hereinafter described and illustrated in the attached drawings, wherein:

Figure 1 is a side view of a frame made in accordance with the invention;

Fig. 2 is an enlarged sectional view on the line 2—2, Fig. 1;

Fig. 3 is an enlarged fragmentary side view showing one end of the frame and the associated blade-tensioning device;

Fig. 4 is a sectional view on the line 4—4, Fig. 3;

Fig. 5 is a view corresponding to Fig. 3 but showing the elements of the tensioning device in released position;

Figs. 6 and 7 are enlarged fragmentary side views illustrating the details and mode of operation of the blade-retaining means;

Fig. 8 is a view corresponding to Fig. 3 illustrating a modification within the scope of the invention, and Fig. 9 is a section on the line 9—9, Fig. 8.

The saw frame illustrated in the drawings comprises two longitudinal relatively adjustable sections 1 and 2, each made in the present instance of steel tubing. The two sections telescope slidably one within the other, and to this end, the cross sectional dimensions of the section 1 are somewhat smaller than those of the section 2. The oval cross sectional form of the tubing prevents the turning of the one section with respect to the other. Adjustment of the effective length of the frame to suit the length of the saw blade is effected by sliding the one section within the other, and means is provided for rigidly locking the two sections together in adjusted position, the locking means being indicated generally by the reference numeral 3. The saw blade is supported on suitably formed link devices 4 and 5 which are attached to the opposite free ends respectively of the saw frame, and one of these devices 5 in the present instance is associated with a locking lever 6, by means of which a suitable tension may be imposed upon the blade.

The link device 4 is shown in Figs. 1 and 2. It consists of two link plates 21 and 22 which are supported in the end of the frame member 1 by a rivet 23, the end of the frame member being slotted on the inside, as indicated at 24, to permit the links to project inwardly towards and in alignment with the opposite end of the frame. The link plate 21 is provided with an aperture 25 through which the rivet 23 passes, and the inner end of the said plate is formed on a bevel 26 so as to seat against the wall of the member 1, as shown in Fig. 1, the said link being thereby supported substantially in the normal position which it occupies when the saw blade is inserted and placed under tension. Preferably the link 21 shall have sufficient angular play about the rivet 23 to permit it to align itself accurately with the saw blade when the latter is placed under tension in the frame. The link 21 is provided at its outer end with an elongated opening 27 which is enlarged transversely towards its inner end, as indicated at 28. The link 22 is somewhat shorter than the link 21, and at its inner end is provided with a slotted opening 29 which receives the rivet 23. The inner end of the link 22 is formed so as to permit this link to pivot freely upon the rivet 23, and to permit also longitudinal adjustment of the link in parallel alignment with the link 21 within the limits imposed by the length of the slots 29 and 27 respectively. Towards its opposite end, the plate 22 has securely riveted therein a transversely projecting stud 31 having an enlarged head 32. This stud projects from the side of the plate 22 which adjoins the plate 21 and is adapted to project through and to interlock with the slotted opening 27 of the latter plate. As stated above, the slot 29 permits the plate 22 a limited longitudinal adjustment with respect to the plate 21 so that the stud 31 may be brought into position opposite the enlarged section of the slot 27 to permit insertion of the head of the stud through this slot. Thereafter a longitudinal adjustment of the plate 22 brings the stud 31 into the relatively narrow outer end of the slot 27, in which position the head 32 functions to lock the two link plates together. The saw blade 33 has an opening 34 which is adapted to receive the stud 31. In inserting the end of the blade in the link device, the plates 21 and 22 are separated to an extent permitting insertion of the stud 31 through the aperture 34 of the blade, and thereafter the stud is inserted in the slot 27 and the plate 22 drawn forwardly so that the stud passes into the narrow outer end of the said slot whereby the link plates are interlocked together at opposite sides of the blade.

As indicated in Fig. 1, the bevel 26 in the link plate 21 is parallel to the wall of the tubular member 1 with a clearance left between the wall of the tube and the beveled edge of the link plate. The result is that while the link plate 21 has limited free movement about its pivotal rivet 23, it remains at all times substantially aligned with its ultimate blade-holding position. On the other hand, the mating link plate 22 pivots freely about the rivet 23 and is consequently available in any convenient position for connection of the blade 33 with the stud 31 riveted to its link plate 22. To insert a blade, therefore, the two links 21 and 22 may conveniently be angularly separated, the blade 33 then attached to the stud 31 as described, the link 22 then rotated towards the link 21, and the stud 31 inserted into the enlargement 28 of the slot 27, and the blade then pulled longitudinally to bring the enlarged stud head 32 into engagement with the contracted portion of the slot 27, thereby locking the blade and the links safely together at this end so that there is no tendency to release again when the other end of the blade is being mounted. This arrangement in conjunction with the solid riveting of the stud 31 in the link plate 22 greatly facilitates the insertion of the blades in the frame, and is of material advantage, particularly under the adverse winter conditions in which this type of saw is frequently used.

The details of the link device 5 are best shown in Figs. 4 to 7, inclusive. This device consists of two link plates 35 and 36 which are pivotally supported against the respective outer faces of the lever 6 by means of a rivet 37. The lever in turn is pivotally secured to the end of the frame member 2 by means of a rivet 38. The terminal end 39 of the frame member is stamped flat, as shown in Fig. 4, and this flattened extremity is provided with an aperture 41 through which the rivet 38 passes. The pivoted end of the lever 6 is bifurcated, as shown at 42 in Fig. 4, the bifurcations lying at opposite sides of the flattened extremity 39 of the frame member. The heads of the rivet 38 are countersunk in the rivet holes 43 of the handle element so that the ends may lie flush with the outer surfaces of the lever bifurcations. The rivet 37 which secures the links 35 and 36 to the lever passes through apertures 44 in the lever bifurcations, these apertures being remote to the openings 43 which receive the rivet 38 and being located on the lever so that the rivet 37 does not interfere with the free swinging movement of the lever around the end of the frame member 2 between the positions shown respectively in Figs. 3 and 5. In the latter position of the lever, the rivet 37 engages the beveled edge 40 of the frame member, and the said edge thereby constitutes a stop limiting the extent to which the links 35 and 36 may be advanced toward the opposite end of the frame.

The link 35 is provided with an aperture 45 for reception of the rivet 37, and at its opposite end this plate is provided with a slotted opening 46 which is enlarged intermediate its ends and preferably on the outer side edge 50 of the slot, as indicated at 47. The link 36 is provided at its inner end with a longitudinally extending slotted opening 48, which receives the rivet 37, and at its opposite or outer end this link carries a stud 49 adapted for insertion in the slotted opening 46 of the link 35. The stud 49 has an enlarged head 51 which is permitted to pass through the enlargement 47 of the slot 46, but when the plate 36 is moved longitudinally so as to bring the body of the pin into either of the relatively narrow ends of the slot, the head functions to lock the two plates together.

It will be noted by reference to Fig. 4 that the free ends of the links 35 and 36 are offset inwardly or toward each other, and these offset ends in assembly lie in parallel and relatively contiguous relation. The stud 49 is adapted to be passed through an opening 52 in the end of the saw blade 33, and when the two plates are interlocked together as described above, the end of the blade is confined between the link plates, as shown in Fig. 4. In inserting the blade, the links are separated to an extent permitting insertion of the blade over the stud 51. Thereafter the head of the stud is inserted through the enlarged portion 47 of the slot 46 and the plate 36 drawn forwardly to an extent bringing the stud into the narrow portion of the said slot whereby the plates are interlocked together at opposite sides of the blade.

In inserting the blade, the lever 6 is turned on its pivot 38 to the position in which it is shown in Fig. 5, and after the blade is secured in the link devices 4 and 5 as described above, the lever is turned back to the position shown in Fig. 3. This movement of the lever draws the links 35 and 36 away from the opposite end of the saw frame and places the blade under the required tension. It will be noted that when the lever is turned to the blade-tensioning position as shown in Fig. 3, the rivet 37 which constitutes the fulcrum for the blade-retaining links is carried upwardly past a dead center position with respect to the lever fulcrum 38 so that the lever is locked under tension in this position. It will be noted further that the stop constituted by the edge 40 and the rivet 37, which restricts the extent to which the link device 5 may be projected toward the opposite end of the frame and toward the link device 4 as previously described, functions to limit the amount of tension that may be imposed upon the saw blade through the lever 6. This definitely precludes overtensioning of the blade and overstraining of the frame. This regulating device is subject to modification, however, to increase the tension if required, such modification being effected by filing the stopping edge of the frame member to increase the arc through which the lever may be swung toward the opposite end of the frame.

In adjusting the frame for a blade of a given length, the frame is set by drawing the two telescoping sections outwardly as far as the blade permits with the lever 6 in the advanced position as shown in Fig. 5 and the two frame sections then locked in position by means of the clamping device 3. The relative adjustability of the companion links of the two devices, longitudinally, angularly, and laterally, contributes materially to the convenience of inserting the blade for this and for any subsequent blade-removing or inserting operation, and also insures that the link plates and the blade will remain mutually self-aligning under tension. The lever 6 is then drawn outwardly and upwardly into the operative locking position shown in Fig. 3, and the blade thus placed under tension. The blade may be withdrawn from the frame by a reverse movement of the lever 6, and it will be noted that the link devices 4 and 5 are so constituted that in this release operation all danger of the blade springing from the retaining links is avoided. This is due to the fact that release of the blade at either end must involve a relative longitudinal movement of the retaining links and subsequent lateral spreading of the links in order to free the blade from the studs. Relative transverse movement of the links can be effected only when the heads of the studs lie directly opposite to the enlarged portions of the link slots 28 or 47, and since these enlarged portions of the slot are intermediate the ends thereof, and preferably are only slightly greater in diameter than the said heads, a relative manual adjustment of the links is essential in order to bring the heads into accurate registration with the said enlargements.

There may be some modification in the aforedescribed device without departure from the invention, and one such modification is illustrated in Figs. 8 and 9. In this case, the lever end of the frame is left unflattened and the lever 6a is made sufficiently wide to embrace the frame, being fulcrumed on it by means of two rivets, 56, 56. The links 35a and 36a are secured on the inside of the lever by the rivet 37a, and extend through slots 53, 53 in the outer and inner sides respectively of the frame end. The slot 46a in the link 35a which receives the stud 49a of the companion link, is in this case provided with a transverse extension 54 to the outer edge of the link through which the stud may be inserted in the slot. In other respects, the embodiment corresponds to that previously described and the operation is essentially the same.

It will be apparent that the blade-retaining and tensioning means herein described is adaptable to many different types of saw frame, either adjustable or non-adjustable and irrespective of the cross sectional contour of said frames, or whether of solid or tubular construction.

I claim:

1. In a saw having in combination a frame, and means for securing a blade under tension between the ends of said frame; two co-acting links pivotally secured to one end of the frame for angular movement relative to the frame and to each other parallel to the plane of the blade, a blade-retaining headed stud on one of said links, a slot in the other of said links for reception of said stud, the outer end of said slot being sufficiently narrow to preclude withdrawal of the head of the stud in the lateral direction, and means providing for longitudinal adjustment of the stud-bearing link with respect to the other of said links, said means comprising a longitudinal slot for said pivot in the stud-bearing link arranged so that the end thereof which lies relatively remote to the stud is engaged by said pivot when the stud engages the outer end of the stud-receiving slot in the other link, whereby both of the links may transmit tension from the frame to the blade.

2. In a saw having in combination a frame, and means for securing a blade under tension between the ends of said frame; two co-acting links pivotally secured to one end of the frame for angular movement relative to the frame and to each other parallel to the plane of the blade, a blade-retaining headed stud on one of said links, a longitudinal slot in the other of said links for reception of said stud, said slot being in part enlarged to admit the head of the stud and being sufficiently narrow in the outer end portion to preclude withdrawal of said head in the lateral direction, and means providing for longitudinal adjustment of the stud-bearing link with respect to the other of said links, and said means comprising a longitudinal slot for said pivot in the stud-bearing link arranged so that the end thereof which lies relatively remote to the stud is engaged by said pivot when the stud engages the outer end of the stud-receiving slot in the other link, whereby both of the links may transmit tension from the frame to the blade, and means providing for lateral separation of the links for insertion and withdrawal of the stud in and from said slot.

3. In a saw having in combination a frame, and means for securing a blade under tension between the ends of said frame; two co-acting links secured to one end of the frame, a blade-retaining headed stud on one of said links, a slot in the other of said links for reception of said stud, said slot having an opening for admission of the stud and being sufficiently narrow at its outer end to preclude withdrawal of the head of the stud in the lateral direction, means for retaining the said slotted link in a position substantially in alignment with the opposite ends of said frame while the other link is angularly displaceable parallel to the slotted link, and means providing for longitudinal adjustment of the stud-carrying link with respect to the slotted link and for pivotal movement of the said stud-carrying link parallel to the plane of the blade, said means comprising a longitudinal slot for said pivot in the stud-bearing link arranged so that the end thereof which lies relatively remote to the stud is engaged by said pivot when the stud engages the outer end of the stud-receiving slot in the other link, whereby both of the links may transmit tension from the frame to the blade.

4. A device for releasably coupling a saw blade to a frame, said device consisting of two co-acting laterally, angularly and longitudinally relatively displaceable link elements, one of said elements having a slot at one end and a stud at the other end, another element having a slot at one end and a pivot at the other end, said link elements being assembled so that the stud engages the slot of one element and the pivot engages the slot of the other element thereby mutually limiting the relative longitudinal displacement of said elements, said pivot attaching an end of each of the link elements to the frame so as to permit their angular displacement relative to the frame and to each other in the plane of the links and to all positions required for assembly, retention, and disassembly of the blade, and the stud at the other and free ends of the link elements constituting a support for the blade, the said free ends of the link elements being laterally separable and being provided with means for locking the blade in place upon the stud and for releasing the blade when the link elements are relatively displaced.

5. A coupling device as set forth in claim 4, characterized by the fact that the blade-retaining stud has an enlarged head, while the mating link element has a slot which is enlarged inwardly from the outer end thereof to provide passage through the slot of said enlarged head.

6. A coupling device in accordance with claim 4, characterized by the fact that one of the companion link elements is limited in its rotation about the said pivot at its attachment to the frame.

ARTHUR N. BLUM.